US012451111B2

(12) United States Patent
Krosner

(10) Patent No.: US 12,451,111 B2
(45) **Date of Patent: *Oct. 21, 2025**

(54) WEARABLE AUDIO DEVICE WITH FEEDBACK INSTABILITY CONTROL

(71) Applicant: Bose Corporation, Framingham, MA (US)

(72) Inventor: Benjamin Jason Krosner, Bedford, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,019

(22) Filed: Mar. 18, 2024

(65) Prior Publication Data

US 2025/0061876 A1 Feb. 20, 2025

Related U.S. Application Data

(63) Continuation of application No. 18/234,067, filed on Aug. 15, 2023, now Pat. No. 11,961,502.

(51) Int. Cl.
*G10K 11/178* (2006.01)
*H04R 1/10* (2006.01)

(52) U.S. Cl.
CPC ......... *G10K 11/178* (2013.01); *H04R 1/1083* (2013.01); *G10K 2210/503* (2013.01); *G10K 2210/506* (2013.01); *H04R 2460/01* (2013.01)

(58) Field of Classification Search
CPC ........... G10K 11/178; G10K 2210/503; G10K 2210/506; H04R 1/1083; H04R 2460/01
USPC ........................................................ 381/71.1
See application file for complete search history.

(56) References Cited

U.S. PATENT DOCUMENTS

| | | | | |
|---|---|---|---|---|
| 10,244,306 | B1 | 3/2019 | Ku et al. | |
| 11,589,154 | B1 | 2/2023 | Ku | |
| 2013/0083938 | A1* | 4/2013 | Bakalos | G10K 11/17833 381/71.8 |
| 2017/0365245 | A1 | 12/2017 | Ku | |
| 2021/0337299 | A1 | 10/2021 | Dickins et al. | |

FOREIGN PATENT DOCUMENTS

| | | | |
|---|---|---|---|
| CN | 103843364 B | 5/2017 | G10K 11/178 |
| WO | WO-2013052327 A2 | 4/2013 | G10K 11/178 |

OTHER PUBLICATIONS

PCT International Search Report and Written Opinion for International Application No. PCT/US2024/037318, dated Oct. 11, 2024, 9 pages.

* cited by examiner

*Primary Examiner* — Carolyn R Edwards
*Assistant Examiner* — Friedrich Fahnert
(74) *Attorney, Agent, or Firm* — Hoffman Warnick LLC

(57) ABSTRACT

Aspects include approaches for feedback instability control in wearable audio devices. In certain cases, a method of controlling feedback instability in a wearable audio device with an active noise reduction (ANR) system includes: determining a current feedback instability by combining outputs from multiple instability detectors, applying latch logic to the current feedback instability to determine a current mitigation value, and adjusting a driver command signal based on the current mitigation value to mitigate feedback instability.

20 Claims, 7 Drawing Sheets

WEARABLE AUDIO DEVICE WITH FEEDBACK INSTABILITY CONTROL

PRIORITY CLAIM

This application claims priority to co-pending U.S. patent application Ser. No. 18/234,067 (filed Aug. 15, 2023), the entire contents of which are incorporated by reference herein.

TECHNICAL FIELD

This disclosure relates to wearable audio devices and related control methods. In particular, this disclosure relates to controlling feedback instability in wearable audio devices.

BACKGROUND

Various audio devices incorporate active noise reduction (ANR) features, also known as active noise control or cancellation (ANC), in which one or more microphones detect sound, such as exterior acoustics captured by a feedforward microphone or interior acoustics captured by a feedback microphone. Signals from a feedforward microphone and/or a feedback microphone are processed to provide anti-noise signals to be fed to an acoustic transducer (e.g., a speaker, driver) to counteract noise that may otherwise be heard by a user. Feedback microphones pick up acoustic signals produced by the driver, and thereby form a closed loop system that could become unstable at times or under certain conditions. Various audio systems that may provide feedback noise reduction include, for example, headphones, earphones, headsets and other portable or personal audio devices, as well as automotive systems to reduce or remove engine and/or road noise, office or environmental acoustic systems, and others.

Certain conventional approaches are used to detect when a condition of feedback instability exists. However, these conventional approaches can suffer from one or more shortcomings. In some cases, high-performance ANR systems suffer from frequent bouts of instability that are difficult for conventional approaches to monitor, e.g., on a continuous basis. Further, some conventional approaches for mitigating instability have binary control mechanisms that can lead to distracting chirps, or spikes in audio output.

SUMMARY

Various implementations are directed to approaches for feedback instability control in wearable audio devices. In certain cases, a method of controlling feedback instability in a wearable audio device with an active noise reduction (ANR) system includes: determining a current feedback instability by combining outputs from multiple instability detectors, applying latch logic to the current feedback instability to determine a current mitigation value, and adjusting a driver command signal based on the current mitigation value to mitigate feedback instability.

In additional cases, a wearable audio device includes: an electro-acoustic transducer for providing an audio output, at least one microphone configured to detect noise; and a controller coupled with the electro-acoustic transducer and the at least one microphone, the controller including an active noise reduction (ANR) system for controlling noise in the audio output, wherein the controller is configured to: determine a current feedback instability by combining outputs from multiple instability detectors, apply latch logic to the current feedback instability to determine a current mitigation value, and adjust a driver command signal based on the current mitigation value to mitigate feedback instability.

All examples and features mentioned below can be combined in any technically possible way.

In certain aspects, applying the latch logic includes: applying a baseline mitigation value associated with a baseline instability as the current mitigation value, and modifying the current mitigation value in response to determining that the current feedback instability exceeds the baseline instability as controlled by a latch mechanism.

In particular cases, modifying the current mitigation value is performed by: comparing the current instability with the baseline instability, if the current instability does not exceed the baseline instability: controlling the baseline mitigation value based on satisfying an unlatch timer, and if the current instability exceeds the baseline instability: selecting the current instability as the current mitigation value, and controlling the baseline mitigation value based on satisfying a latch timer.

In some implementations, controlling the baseline mitigation value based on satisfying the unlatch timer includes: if the unlatch timer is exceeded, lowering the baseline mitigation value, and if the unlatch timer is not exceeded, maintaining the baseline mitigation value.

In particular cases, controlling the baseline mitigation value based on satisfying the latch timer includes: if the latch timer is exceeded, raising the baseline mitigation value, and if the latch timer is not exceeded, maintaining the baseline mitigation value.

In some cases, the unlatch timer is greater than the latch timer.

In certain aspects, the unlatch timer is approximately one minute or more.

In particular cases, the unlatch timer is approximately thirty minutes or more.

In certain implementations, the latch timer is approximately several seconds or less.

In some aspects, the latch timer is approximately several milliseconds to approximately several hundred milliseconds.

In particular cases, the baseline mitigation value is a single value.

In certain aspects, the baseline mitigation value is greater than zero and no greater than one.

In particular implementations, the baseline mitigation value is applied to the ANR system until a triggering event is detected.

In some cases, the triggering event includes at least one of: power cycling of the wearable audio device, switching operating modes of the wearable audio device, activating the ANR system, deactivating the ANR system, detecting a donning of the wearable audio device, or detecting doffing of the wearable audio device. In certain aspects, the triggering event(s) can be adjusted based on user preferences or other settings adjustments.

In particular implementations, applying the baseline mitigation value is performed after detecting the baseline instability value exceeds a nominal instability value associated with a nominal instability mitigation value.

In some cases, the nominal value is associated with a startup operation, a restart operation, or a mode change of the ANR system.

In particular implementations, the baseline mitigation value is a lowest available multiplier that can be applied to the driver command signal.

In certain aspects, the method further includes passing each output from the multiple instability detectors through a corresponding low pass filter.

In certain aspects, the method further includes determining an instability error value for the ANR system based on a comparison of the current instability value to a setpoint instability value, and, applying a gain to the instability error value.

In some cases, adjusting the driver command signal based on the current mitigation value smooths a transition between ANR settings.

In particular implementations, the method further includes feeding the current mitigation value into an integrator to control a baseline mitigation value.

In certain aspects, feeding the current mitigation value into the integrator in controlling the baseline mitigation value smooths a transition between outputs from the ANR system.

In some cases, the current mitigation value is summed with the current feedback instability at the integrator.

In particular aspects, the method further includes feeding the summed current mitigation value and current feedback instability value back through the latch logic.

In certain implementations, the current mitigation value is continuously updated based on changes in the current feedback instability.

In some aspects, the current mitigation value is greater than zero and no greater than one, and the current mitigation value is incrementally adjustable.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

Figure 1:
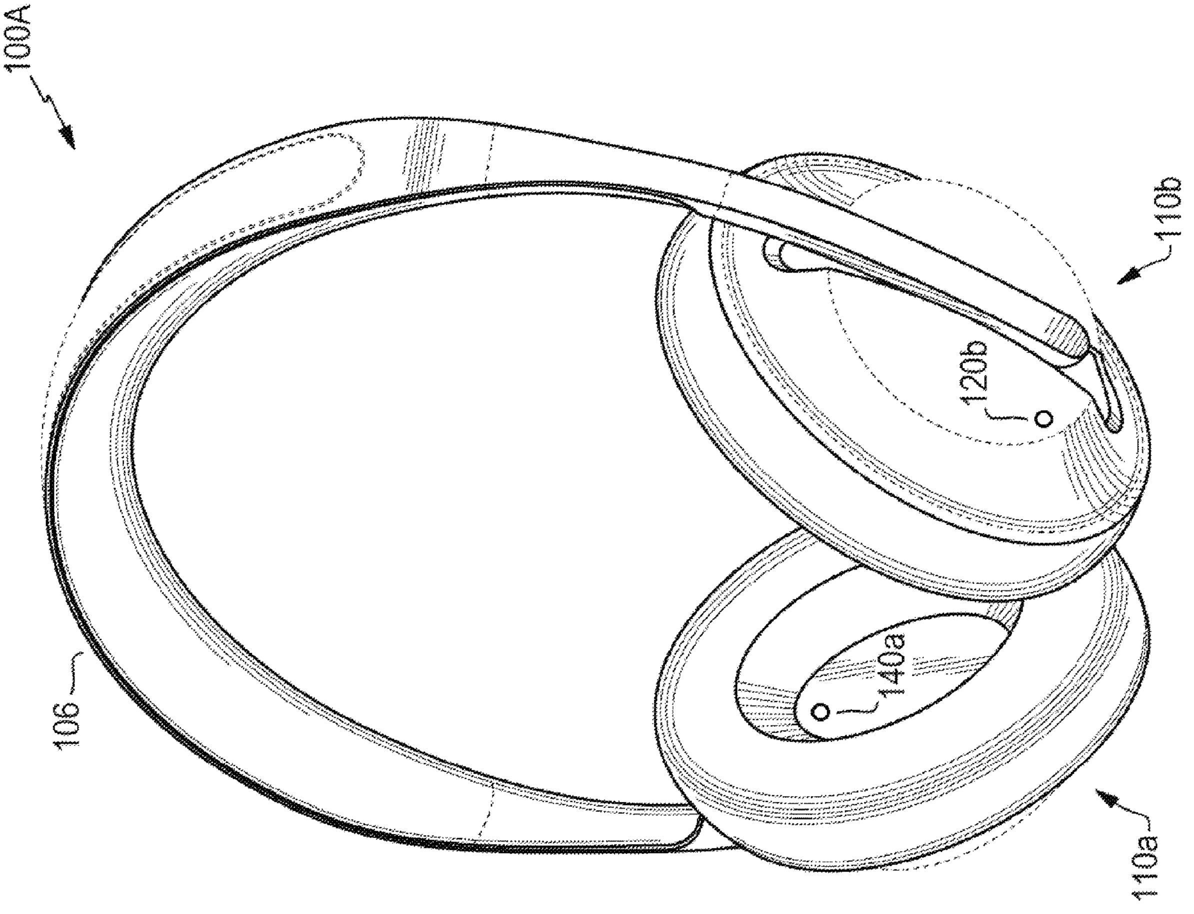
FIG. 1 is a perspective view of one example headset according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

Various disclosed implementations include devices and approaches for controlling feedback instability in an active noise reduction (ANR) system, e.g., at a wearable audio device. In particular cases, a current feedback instability (also called “real time” feedback instability) is determined using combined inputs from multiple instability detectors. Latch logic is applied to the current feedback instability to determine a current (or, “real time”) mitigation value. A driver command signal is then controlled (e.g., adjusted, or maintained) based on the current mitigation value in order to mitigate feedback instability. In certain cases, the latch logic uses a set of timers to control adjustment of the current mitigation value and smooth transition(s) between distinct ANR settings.

Commonly labeled components in the FIGURES are considered to be substantially equivalent components for the purposes of illustration, and redundant discussion of those components is omitted for clarity.

Various disclosed implementations relate to feedback instability mitigation, described for example in U.S. Pat. No. 10,244,306 (Real-Time Detection of Feedback Instability, issued Mar. 26, 2019) and U.S. Pat. No. 11,589,154 (Wearable Audio Device Zero-Crossing Based Parasitic Oscillation Detection, issued Feb. 21, 2023), the entire contents of each of which is hereby incorporated by reference.

Figure 2:
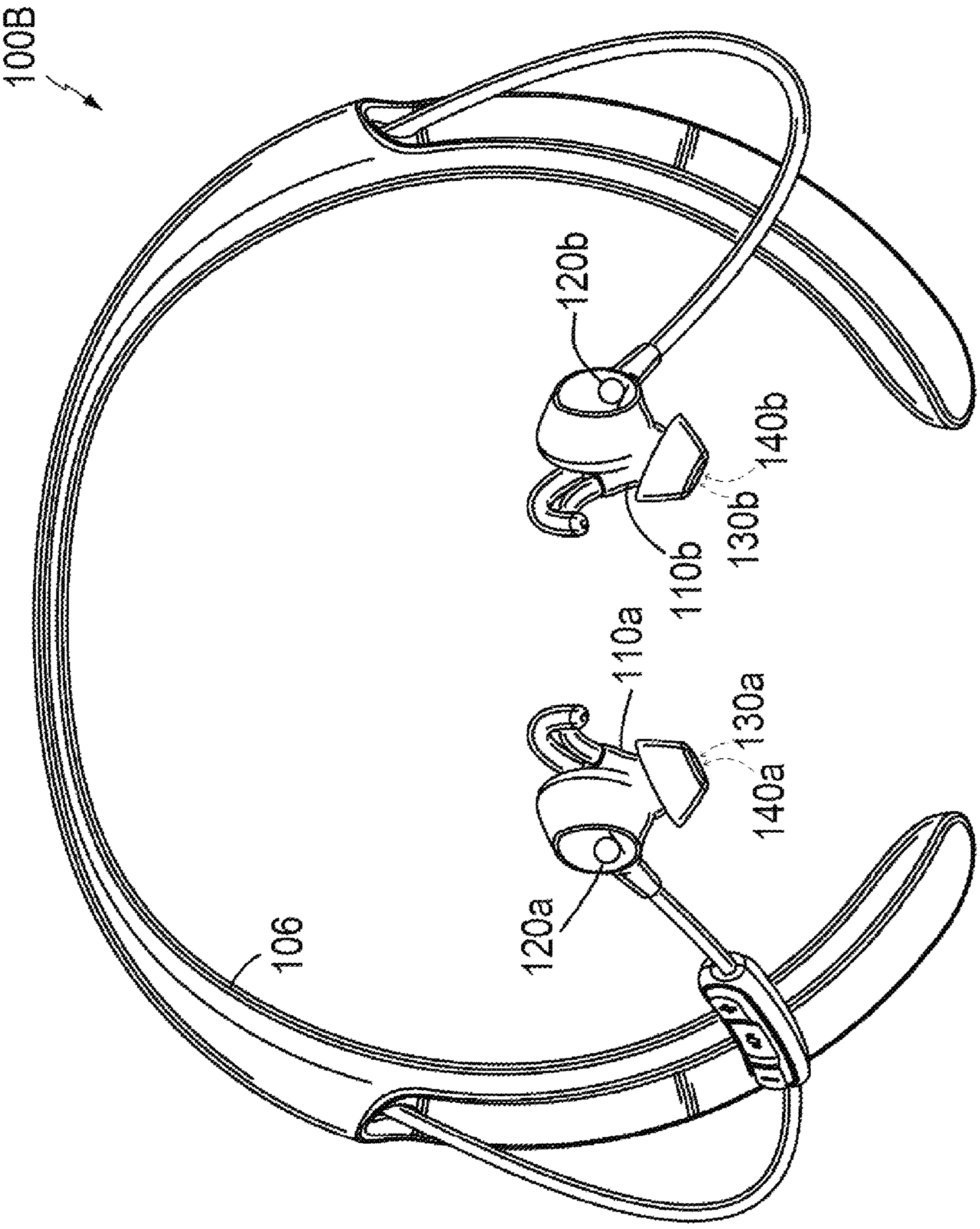
FIG. 2 is a perspective view of another example headset according to various implementations.

FIGS. 1 and 2 illustrate two example headsets 100A, 100B. Each headset 100 includes a right earpiece 110*a* and a left earpiece 110*b*, intercoupled by a supporting structure 106 (e.g., a headband, neckband, etc.) to be worn by a user. In some examples, two earpieces 110 may be independent of each other, not intercoupled by a supporting structure. Each earpiece 110 may include one or more microphones, such as a feedforward microphone 120 and/or a feedback microphone 140. The feedforward microphone 120 may be configured to sense acoustic signals external to the earpiece 110 when properly worn, e.g., to detect acoustic signals in the surrounding environment before they reach the user’s ear. The feedback microphone 140 may be configured to sense acoustic signals internal to an acoustic volume formed with the user’s ear when the earpiece 110 is properly worn, e.g., to detect the acoustic signals reaching the user’s ear. Each earpiece also includes a driver 130, which is an acoustic transducer for conversion of, e.g., an electrical signal, into an acoustic signal that the user may hear. In various examples, one or more drivers may be included in an earpiece, and an earpiece may in some cases include only a feedforward microphone or only a feedback microphone.

While the reference numerals 120 and 140 are used to refer to one or more microphones, the visual elements illustrated in the figures may, in some examples, represent an acoustic port wherein acoustic signals enter to ultimately reach such microphones, which may be internal and not physically visible from the exterior. In examples, one or more of the microphones 120, 140 may be immediately adjacent to the interior of an acoustic port, or may be removed from an acoustic port by a distance, and may include an acoustic waveguide between an acoustic port and an associated microphone.

Figure 3:
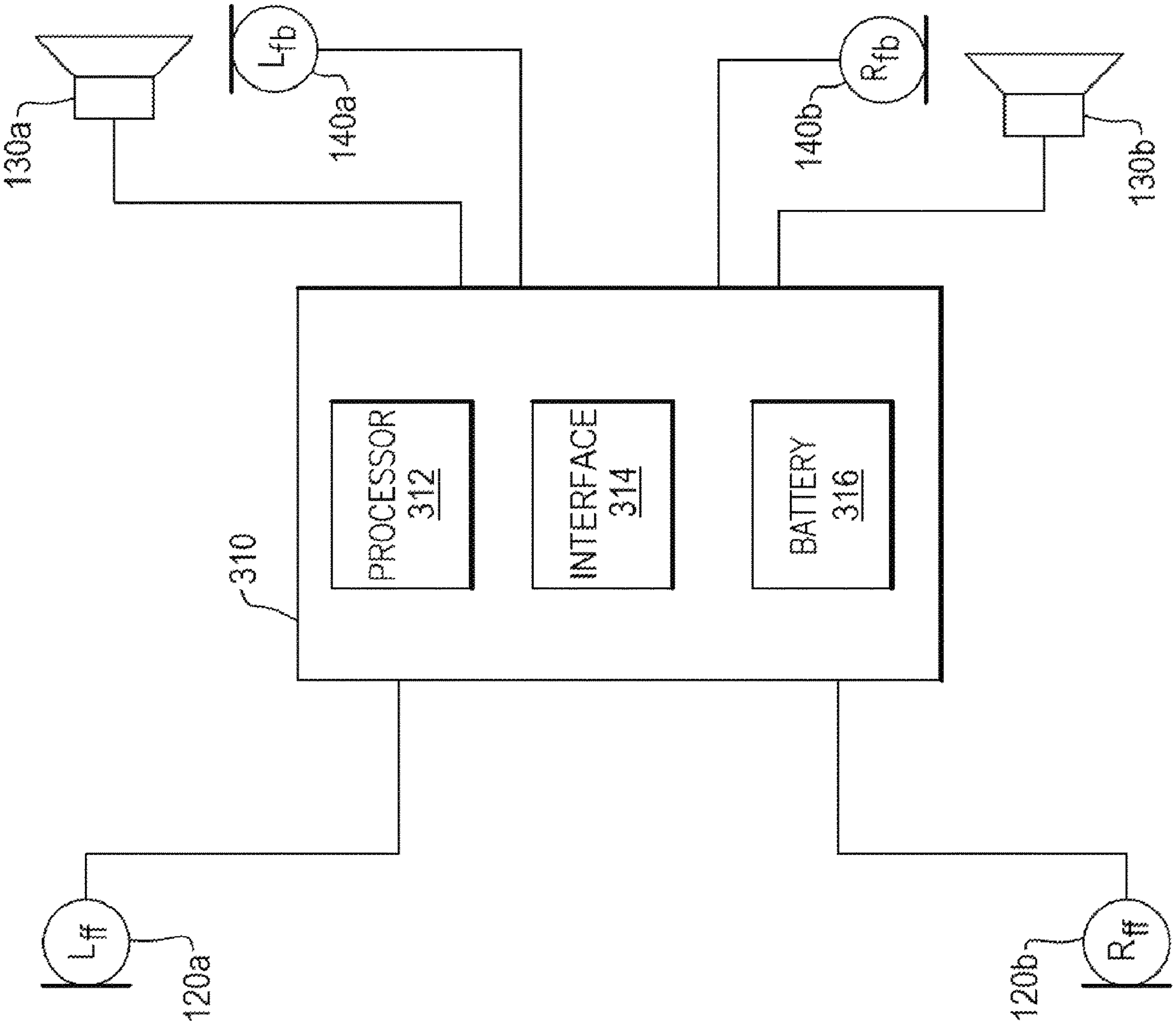
FIG. 3 is a schematic block diagram of an example audio processing system that may be incorporated into audio systems according to various implementations.

Shown in FIG. 3 is an example of a processing unit 310 that may be physically housed somewhere on or within the headset 100. The processing unit 310 may include a processor 312, an audio interface 314, and a battery 316. The processing unit 310 may be coupled to one or more feedforward microphone(s) 120, driver(s) 130, and/or feedback microphone(s) 140, in various examples. In various examples, the interface 314 may be a wired or a wireless interface for receiving audio signals, such as a playback audio signal or program content signal, and may include further interface functionality, such as a user interface for receiving user inputs and/or configuration options. In various examples, the battery 316 may be replaceable and/or rechargeable. In various examples, the processing unit 310 may be powered via means other than or in addition to the battery 316, such as by a wired power supply or the like. In some examples, a system may be designed for noise reduction only and may not include an interface 314 to receive a playback signal.

Figure 4:
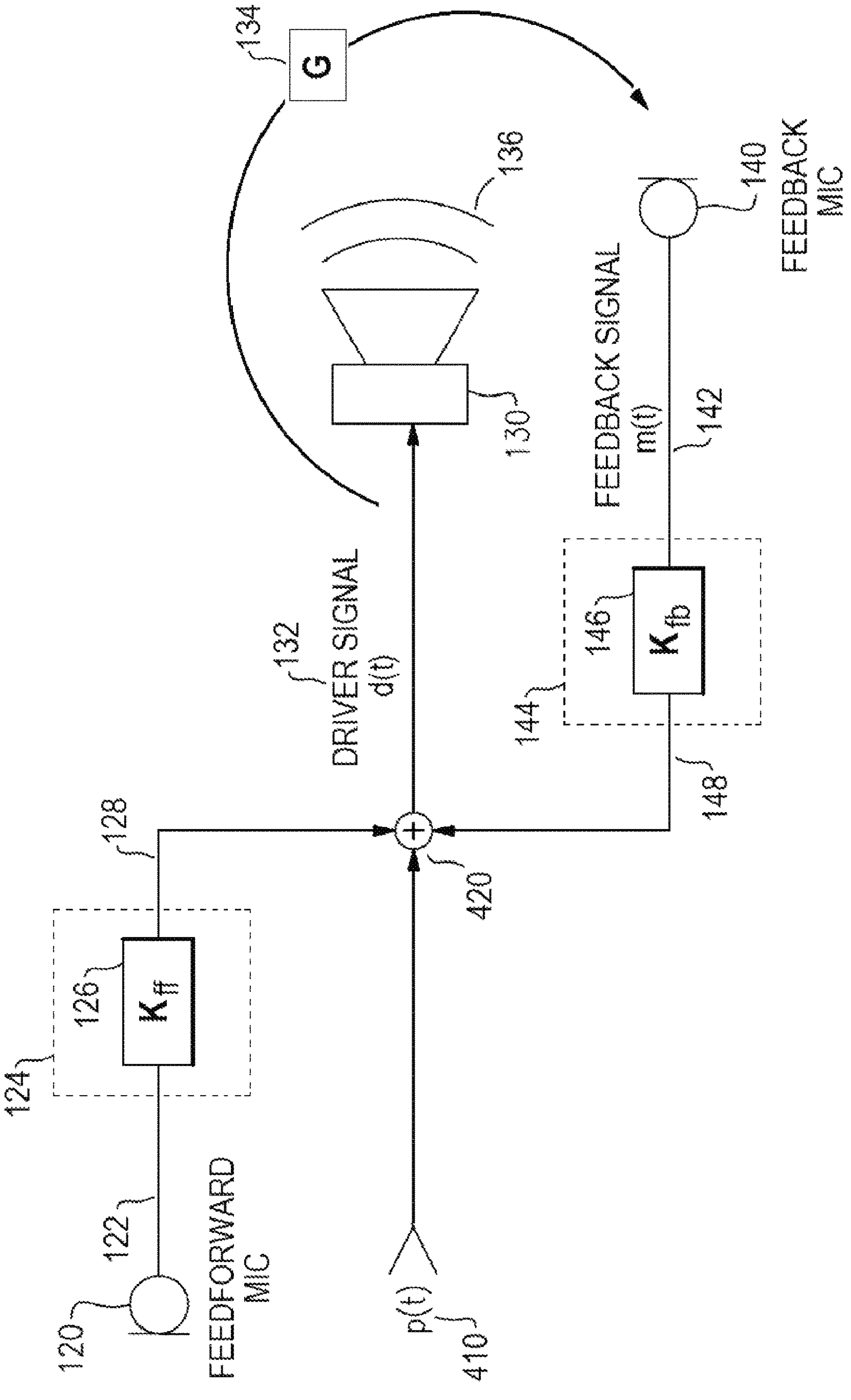
FIG. 4 is a schematic block diagram of an example noise reduction system incorporating feedforward and feedback components according to various implementations.

FIG. 4 illustrates a system for processing microphone signals to reduce noise reaching the user's ear. FIG. 4 presents a simplified schematic diagram to highlight features of a noise reduction system. Various examples of a complete system may include amplifiers, analog-to-digital conversion (ADC), digital-to-analog conversion (DAC), equalization, sub-band separation and synthesis, and other signal processing or the like. In some examples, a playback signal 410, p(t), may be received to be rendered as an acoustic signal by the driver 130. The feedforward microphone 120 may provide a feedforward signal 122 that is processed by a feedforward processor 124, having a feedforward transfer function 126, $K_{ff}$, to produce a feedforward anti-noise signal 128. The feedback microphone 140 may provide a feedback signal 142 that is processed by a feedback processor 144, having a feedback transfer function 146, $K_{fb}$, to produce a feedback anti-noise signal 148. In various examples, any of the playback signal 410, the feedforward anti-noise signal 128, and/or the feedback anti-noise signal 148 may be combined, e.g., by a combiner (or, compiler) 420, to generate a driver signal 132, d(t), to be provided to the driver 130. In various examples, any of the playback signal 410, the feedforward anti-noise signal 128, and/or the feedback anti-noise signal 148 may be omitted and/or the components necessary to support any of these signals may not be included in a particular implementation of a system.

Various examples described herein include a feedback noise reduction system, e.g., a feedback microphone 140 and a feedback processor 144 having a feedback transfer function 146 to provide a feedback anti-noise signal 148 for inclusion in the driver signal 132. The feedback microphone 140 may be configured to detect sound within the acoustic volume that includes the user's ear and, accordingly, may detect an acoustic signal 136 produced by the driver 130, such that a loop exists. Accordingly, in various examples and/or at various times, a feedback loop may exist from the driver signal 132 through the driver 130 producing an acoustic signal 136 that is picked up by the feedback microphone 140, processed through the feedback transfer function 146, $K_{fb}$, and included in the driver signal 132. Accordingly, at least some components of the feedback signal 142 are caused by the acoustic signal 136 rendered from the driver signal 132. Alternately stated, the feedback signal 142 includes components related to the driver signal 132.

The electrical and physical system shown in FIG. 4 exhibits a plant transfer function (G) 134, characterizing the transfer of the driver signal 132 through to the feedback signal 142. In other words, the response of the feedback signal 142 to the driver signal 132 is characterized by the plant transfer function (G) 134. The system of the feedback noise reduction loop is therefore characterized by the combined (loop) transfer function, $GK_{fb}$. If the loop transfer function, $GK_{fb}$, becomes equal to unity, $GK_{fb}=1$, at one or more frequencies, the loop system may diverge, causing at least one frequency component of the driver signal 132 to progressively increase in amplitude. This may be perceived by the user as an audible artifact, such as a tone or squealing, and may reach a limit at a maximum amplitude the driver 130 is capable of producing, which may be extremely loud. Accordingly, when such a condition exists, the feedback noise reduction system may be described as unstable.

Various examples of an earpiece 110 with a driver 130 and a feedback microphone 140 may be designed to avoid feedback instability, e.g., by designing to avoid or minimize the chances of the loop transfer function, $GK_{fb}$, having undesirable characteristics. Despite various quality designs, a loop transfer function, $GK_{fb}$, may nonetheless exhibit instability at various times or under certain conditions, e.g., by action of the plant transfer function (G) 134 changing due to movement or handling of the earpiece 110 by the user, such as when putting a headset on or off, or adjusting the earpiece 110 while worn. In some cases, a fit of the earpiece 110 may be less than optimal or may be out of the norm and may provide differing coupling between the driver 130 and the feedback microphone 140 than anticipated. Accordingly, the plant transfer function (G) 134 may change at various times to cause an instability in the feedback noise reduction loop. In some examples, processing by the feedback processor 144 may include active processing that may change a response or transfer function, such as by including one or more adaptive filters or other processing that may change the feedback transfer function, Kfb, at various times. Such changes as these may cause (or remedy) an instability in the feedback noise reduction loop.

Certain example systems and methods, for example, as described in U.S. Pat. No. 10,244,306 (previously incorporated by reference herein) operate to monitor for a condition in which a loop transfer function, $GK_{fb}$, becomes equal to unity, $GK_{fb}=1$, and to indicate that a feedback instability exists when so determined. With continued reference to FIG. 4, when the loop transfer function equals unity, such may be equivalently expressed as the plant transfer function (G) 134 being the inverse (e.g., reciprocal) of the feedback transfer function 146, Kfb, thereby satisfying the expression, $G=K_{fb}-1$. Accordingly, a feedback noise reduction system may be unstable when a plant transfer function (e.g., 134) is the inverse of a feedback transfer function (e.g., 146).

As discussed previously, the feedback signal 142 may include components of the driver signal 132. When a feedback instability exists, components of the feedback signal 142 may be related to the driver signal 132 by the inverse of the feedback transfer function 146, because during an instable condition the plant transfer function (G) 134 may be inversely related to the feedback transfer function 146. Certain example systems and methods, for example, as described in U.S. Pat. No. 10,244,306 (previously incorporated by reference herein) may detect feedback instability by monitoring for components in the feedback signal 142 being related to the driver signal 132 such that the relationship is the inverse of the feedback transfer function 146. In some such examples, the driver signal 132 is filtered by the inverse of the feedback transfer function 146 and the resulting signal is compared to the feedback signal 142. In certain cases, a threshold level of similarity may indicate that the plant transfer function 134 is nearly equal to the inverse of the feedback transfer function 146, and thus may indicate that a feedback instability exists. While these conventional systems can effectively detect (and in many cases mitigate) feedback instability, they may still create audible artifacts such as chirps that are disturbing to the user. As noted herein, various disclosed implementations can mitigate the chirps in conventional feedback instability approaches, for example, by using latch logic to adaptively control a baseline mitigation value.

Figure 5:
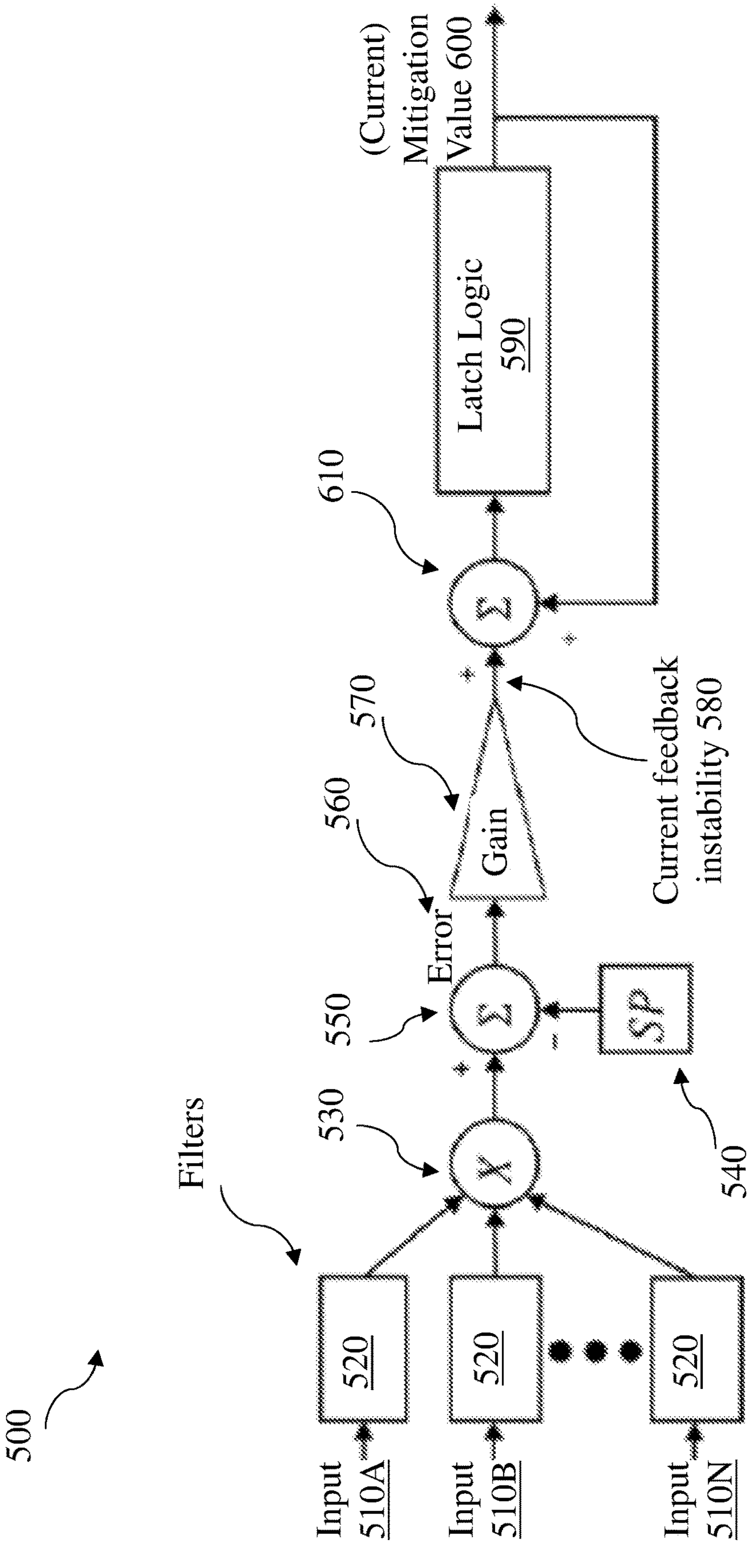
FIG. 5 is a schematic block diagram of a feedforward instability mitigation controller according to various implementations.

Certain conventional systems (e.g., as disclosed in U.S. Pat. No. 10,244,306 and 11,589,154, each previously incorporated by reference herein) describe systems for identifying feedback instability. FIG. 5 shows a controller (or, feedback instability controller) 500 configured to control feedback instability in a earpiece 110 according to various implementations. In certain cases, controller 500 is part of the feedback processor 144 and is configured to provide a feedback mitigation output to adjust a driver command signal 132 based on detected feedback instability in the feedback anti-noise signal 148.

Figure 6:
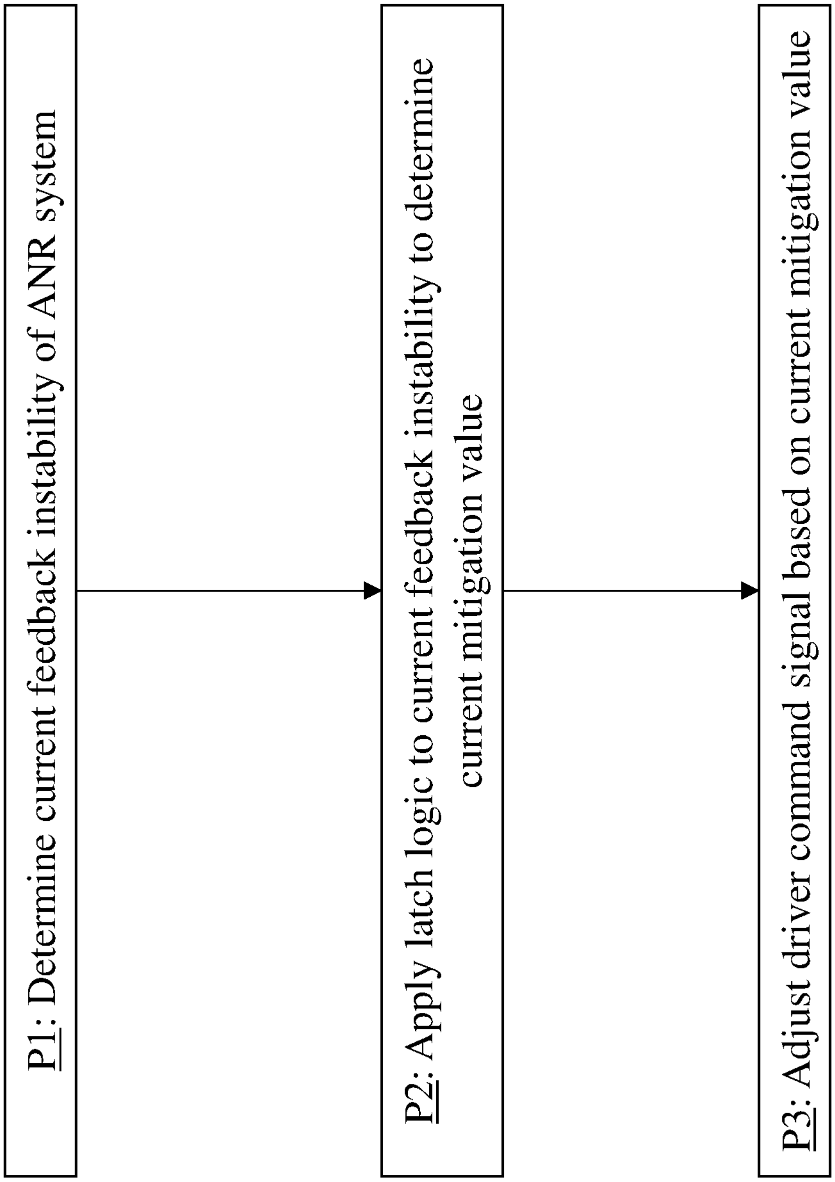
FIG. 6 is a flow diagram illustrating processes performed by a feedforward instability mitigation controller according to various implementations.

FIG. 6 is a flow diagram illustrating processes in a method performed by the controller 500 (FIG. 5) according to certain implementations. In various implementations, controller 500 is configured to perform processes (P) including: 1) determine a current feedback instability of the ANR system, 2) apply latch logic to the current feedback instability to determine a current mitigation value, and 3) adjust a driver command signal 132 based on the current mitigation value in order to mitigate feedback instability.

As used herein, "current feedback instability" is the present, or real-time feedback instability in the feedback signal 142 as detected by one or more feedback instability detectors. This current feedback instability will vary over time, and with changes in user behavior and ambient acoustic conditions. As described herein, the controller 500 is configured to adapt to changes in current feedback instability. As also used herein, "current mitigation value" refers to the present, or real-time feedback instability mitigation value applied to the driver command signal to mitigate feedback instability. This current mitigation value will vary over time, for example, as the current feedback instability changes and/or as the latch logic determines an adjustment of the current mitigation value. The current mitigation value is applied to the feedback anti-noise signal 148 to adjust the driver signal 132 according to various embodiments. In various implementations, the current mitigation value is no less than zero and no greater than one. A "nominal instability value" is associated with a nominal instability mitigation value that is applied, for example, at a startup of the ANR system. In various implementations, applying the nominal instability mitigation value may not use latch logic (or otherwise be modified by latch logic) as described herein. The term "baseline mitigation value" is also used herein and can refer to the lowest available multiplier that can be applied to the driver command signal (a multiplier called $K_{par}$). In various implementations, the baseline mitigation value is associated with a baseline instability value, e.g., an instability value that exceeds the nominal instability value, and uses latch logic to control the current mitigation value. In various implementations, this "baseline mitigation value" can include a single value, can be adjusted over time, is greater than zero, and is no greater than one. In certain cases, the baseline mitigation value is a fractional value, for example, 0.1, 0.2, 0.3, 0.4, etc., 0.05, 0.15, 0.25, 0.35, etc., or 0.02, 0.04, 0.06, 0.08, etc. As will be described herein, the baseline mitigation value can be adjusted according to latch logic to track (e.g., dynamically adapt to) changes in current feedback instability.

Further details of processes performed by the controller 500 are noted with reference to FIG. 5. In these cases, the controller 500 is configured to receiving inputs 510 from multiple instability detectors. In certain cases, inputs 510A, 510B, 510*n*, from two or more instability detectors are used to identify feedback instability in the ANR system (e.g., in the feedback anti-noise signal 148). For example, U.S. Pat. No. 10,244,306 and 11,589,154 describe distinct algorithms for detecting feedback instability in an ANR system. Using inputs 510 from multiple instability detectors (as compared with a single detector) can enhance accuracy in detection of the instability, as well as mitigate errors in quantifying the instability. In various implementations, at least two of the instability detectors are distinct, e.g., with distinct approaches and/or logic for detecting instability. Inputs 510 can each quantify an instability value as detected by a particular detector (e.g., algorithm).

With continuing reference to FIG. 5, in particular optional implementations, inputs 510A, 510B, etc., are passed through one or more filters 520, such as a set of low-pass filters (LPF(s)). Filters 520 (e.g., LPFs) can have a cutoff frequency, for example, that ranges from approximately 1 Hertz (Hz) to approximately 10 kHz. After passing through filters 520, the filtered outputs 510A, 510B, etc., are multiplied together (at multiplier 530) and that value is compared with an instability threshold (or setpoint, SP) 540 at integrator 550 to generate an error 560. In various implementations, the threshold (SP) 540 is greater than zero. In particular cases, the threshold (SP) 540 changes over time based on an operating mode of the ANR system or a current mitigation value applied by the controller 500. For example, the controller 500 may run one or more additional signal processing algorithms (e.g., in parallel) that impact applied mitigation. In these cases, the threshold 540 can be altered, e.g., to avoid triggers associated with sub-instability peaking. In additional cases, the threshold 540 is fixed. The error 560 represents a difference between the threshold 540 and the combined (multiplied) instability detected from inputs 510A, 510B, 510N. A gain 570 is applied to the error 560, generating a value for current (or real-time) feedback instability 580.

With continuing reference to FIG. 5, according to various implementations, latch logic 590 is applied to the current feedback instability (value) 580 to determine a current mitigation value 600, e.g., for adjusting a driver command signal. As shown in FIG. 5, the output from the latch logic 590 (as current mitigation value 600) is also summed (at integrator 610) with the current feedback instability 580 and fed back through the latch logic 590 in order to continuously update the current mitigation value 600 based on changes in the current feedback instability 580. As described herein, the current mitigation value 600 can be adjusted between various non-zero values according to the current feedback instability and the latch logic 590. These incremental mitigation values can enable smooth transitions between ANR settings (e.g., as applied to the driver signal).

Figure 7:
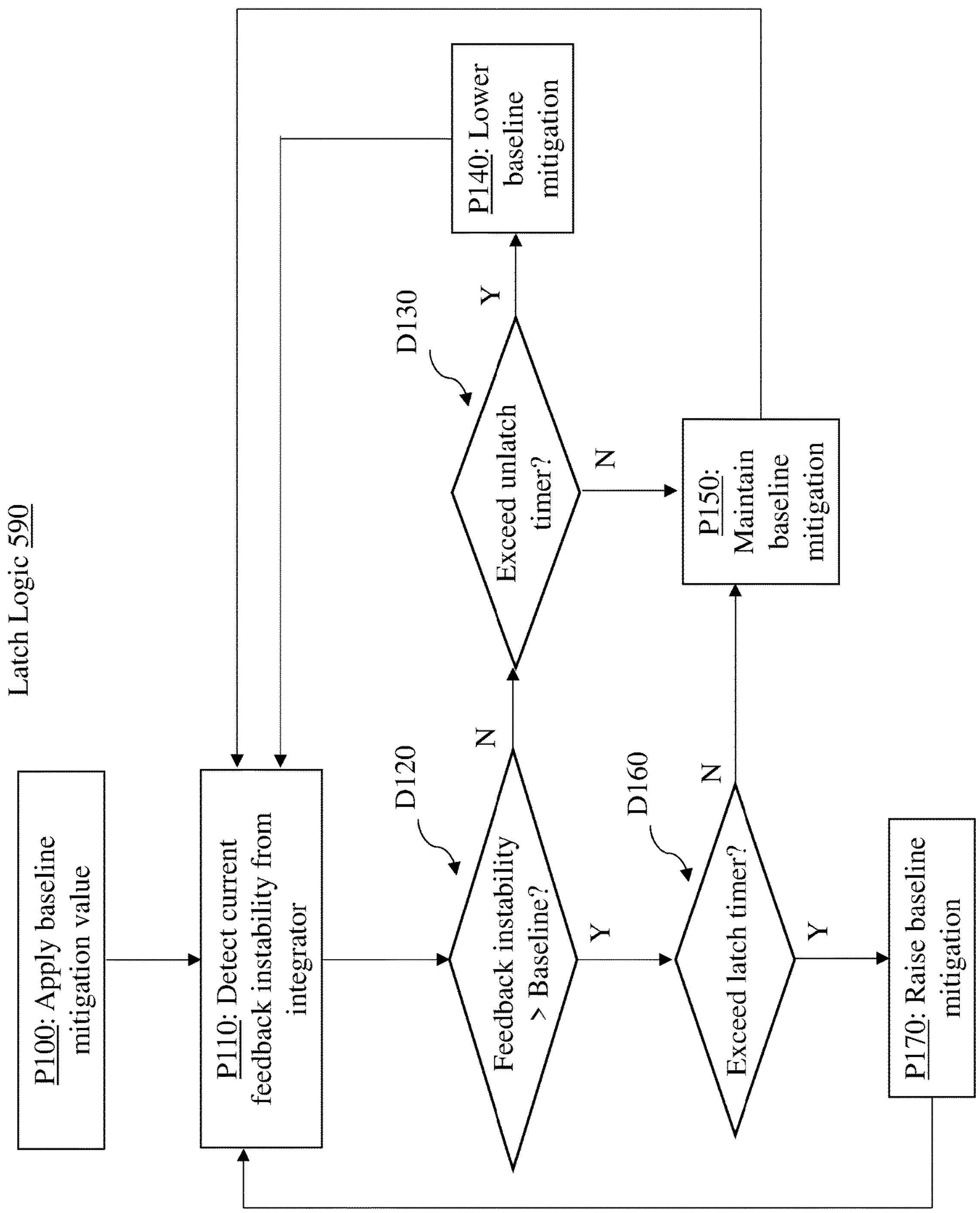
FIG. 7 is a flow diagram illustrating processes performed by latch logic to control a mitigation value for a driver signal according to various implementations.

FIG. 7 is a flow diagram illustrating processes performed in applying the latch logic 590 to the current feedback instability 580 according to various implementations. As shown, process P100 can include applying a baseline mitigation value associated with a baseline instability as the current mitigation value 600. That is, the current mitigation value is set to the baseline mitigation value associated with baseline instability. In certain cases, applying the baseline mitigation value is performed after detecting the current instability value exceeds a nominal instability value associated with a nominal instability mitigation value. In some examples, the nominal value is associated with a startup operation, a restart operation, or a mode change of the ANR system (e.g., between activating and deactivating ANR, changing from an "aware" or hear-through mode to full ANR, switching between operating modes such as telephone audio to music or other content playback, etc.). As noted herein, the initial baseline mitigation value is a lowest available multiplier that can be applied to the driver command signal. In particular examples, the initial baseline mitigation value is equal to the nominal instability mitigation value. In certain of these examples, the nominal instability mitigation value is equal to zero.

Process P110 can include detecting the current feedback instability, e.g., as determined by output from integrator 610. Decision D120 can include comparing the current feedback instability with the baseline instability. If the current feedback instability is equal to or less than the baseline instability (No to D120), in decision D130, an unlatch timer is applied to control the baseline mitigation value. In particular, if the unlatch timer is exceeded (Yes to D130), the baseline mitigation value is lowered in process P140. If the latch timer is not exceeded (No to D130), the baseline mitigation value is maintained in process P150. Returning to D120, if current feedback instability is greater than the baseline instability (Yes to D120), in decision D160, a latch timer is applied to control the baseline mitigation value. In particular, if the latch timer is exceeded (Yes to D160), the baseline mitigation value is raised in process P170. If the latch timer is not exceeded (No to D160), the baseline mitigation value is maintained (revert to P150). As noted herein, the mitigation values are adjusted (or maintained) within the lower bound of zero and upper bound of one.

In various implementations, the unlatch timer is greater (longer in time) than the latch timer. In some non-limiting examples, the unlatch timer is approximately one minute or more, and in further cases approximately thirty minutes or more. In some non-limiting examples, the latch timer is approximately several seconds or less, and in further cases, approximately several milliseconds to approximately several hundred milliseconds. In other terms, the latch logic 590 decays (or unlatches) slower than it latches, preventing frequent peaking and instabilities that can cause chirps and other audible artifacts. Further, because the current mitigation value 600 is fed back to the integrator 610 in controlling the baseline mitigation value, transitions between ANR output (or, settings) are smoothed.

With continuing reference to FIG. 7, in various implementations, processes P140, P150, and P170 revert back to process P110, i.e., detecting the current feedback instability from the integrator 610. In various implementations, as noted herein with respect to FIG. 5, the output of the latch logic 590 is fed back to the integrator 610 to further adjust the mitigation value 560 as the current feedback instability 580 is updated or changes over time.

As noted herein, the latch logic 590 is configured to control the current mitigation value 600, or output to the driver input signal 132 (FIG. 4), by adjusting the baseline mitigation value. In various implementations, the adjusted baseline mitigation value is applied to the ANR system (e.g., via driver input signal 132) until a triggering event is detected. Examples of triggering events include at least one of: power cycling of the headset (e.g., wearable audio device) 100, switching operating modes of the headset 100, activating the ANR system, deactivating the ANR system, detecting a donning of the headset 100, or detecting doffing of the headset 100. In certain implementations, triggering events can cause the latch logic 590 to reset to a nominal mitigation value for applying to the driver signal 132. Further, a profile for the headset 100 (e.g., user specific or device specific profile(s)) can be adjusted to enable or disable types of triggering events. An interface at the headset 100 or a connected device (e.g., smart device) can enable a user to adjust triggering event settings.

As noted herein, various user behaviors and/or environmental conditions can trigger feedback instability and benefit from the disclosed approaches and devices. For example, user behaviors and/or environmental conditions may modify the space between the feedback microphone and the user's ear, for example, a user chewing, clicking her jaw, or tapping on an earpiece. Additional examples can include a user leaning against a surface while wearing an earpiece, e.g., leaning on a surface in a train, airplane or other vehicle. In such cases, the ANR controller (and related approaches) can adaptively respond by adjusting the (current) mitigation value 600 to the earpiece driver.

As noted herein, various implementations include an ANR controller that uses latch logic to adaptively respond to feedback instability. The approaches and devices disclosed herein can quickly respond to changes in real time (or current) feedback instability, and smooth transitions between ANR output. The technical effect of such approaches and devices is to mitigate acoustic disturbances to a user generated by an ANR system while still providing effective noise reduction.

The controller(s) in the headset 100 can execute instructions (e.g., software), including instructions stored in a memory or in a secondary storage device (e.g., a mass storage device). The controller(s) in the headset 100 may be implemented as a chipset of chips that include separate and multiple analog and digital processors. The controllers in headset 100 may provide, for example, for coordination of other components in the ANR headpiece, such as control of user interfaces, applications run by additional electronics in the ANR headpiece, and network communication by the ANR headpiece. The controller in the headset 100 may manage communication with a user through a connected display and/or a conventional user input interface.

The systems and methods disclosed herein may include or operate in, in some examples, headsets, headphones, hearing aids, or other personal audio devices, as well as acoustic noise reduction systems that may be applied to home, office, or automotive environments. Throughout this disclosure the terms "headset," "headphone," "earphone," and "headphone set" are used interchangeably, and no distinction is meant to be made by the use of one term over another unless the context clearly indicates otherwise. Additionally, aspects and examples in accord with those disclosed herein are applicable to various form factors, such as in-ear transducers or earbuds and on-ear or over-ear headphones, and others.

Examples disclosed may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For various components described herein, a designation of "a" or "b" in the reference numeral may be used to indicate "right" or "left" versions of one or more components. When no such designation is included, the description is without regard to the right or left and is equally applicable to either of the right or left, which is generally the case for the various examples described herein. Additionally, aspects and examples described herein are equally applicable to monaural or single-sided personal acoustic devices and do not necessarily require both of a right and left side.

Examples of the headphones described herein are not limited in application to the details of construction and the arrangement of components set forth in the following description or illustrated in the accompanying drawings. The headphones are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

The term "approximately" as used with respect to values herein can allot for a nominal variation from absolute values, e.g., of several percent or less. Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). Similarly, the term "in response to" is used to indicate any of its ordinary meanings, including "in response to at least."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Any incorporation by reference of a portion of a document shall also be understood to incorporate definitions of terms or variables that are referenced within the portion, where such definitions appear elsewhere in the document, as well as any figures referenced in the incorporated portion.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawings.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

I claim:

1. A method of controlling feedback instability in a wearable audio device with an active noise reduction (ANR) system, the method comprising:

determining a current feedback instability by combining outputs from multiple instability detectors, applying latch logic to the current feedback instability to determine a current mitigation value, wherein applying the latch logic comprises:

applying a baseline mitigation value associated with a baseline instability as the current mitigation value, and modifying the current mitigation value in response to determining that the current feedback instability exceeds the baseline instability as controlled by a latch mechanism; and adjusting a driver command signal based on the current mitigation value to mitigate feedback instability, wherein the baseline mitigation value is a lowest available multiplier that can be applied to the driver command signal.

2. The method of claim 1, wherein the baseline mitigation value is a single value that is greater than zero and no greater than one.

3. The method of claim 1, wherein applying the baseline mitigation value is performed after detecting the baseline instability value exceeds a nominal instability value associated with a nominal instability mitigation value.

4. The method of claim 3, wherein the nominal instability value is associated with a startup operation, a restart operation, or a mode change of the ANR system.

5. The method of claim 1, further comprising feeding the current mitigation value into an integrator to control a baseline mitigation value.

6. The method of claim 5, wherein feeding the current mitigation value into the integrator in controlling the baseline mitigation value smooths a transition between outputs from the ANR system.

7. The method of claim 5, wherein the current mitigation value is summed with the current feedback instability at the integrator.

8. The method of claim 7, further comprising feeding the summed current mitigation value and current feedback instability value back through the latch logic.

9. The method of claim 7, wherein the current mitigation value is continuously updated based on changes in the current feedback instability.

10. The method of claim 7, wherein the current mitigation value is greater than zero and no greater than one, and wherein the current mitigation value is incrementally adjustable.

11. A wearable audio device comprising:

an electro-acoustic transducer for providing an audio output, at least one microphone configured to detect noise; and a controller coupled with the electro-acoustic transducer and the at least one microphone, the controller including an active noise reduction (ANR) system for controlling noise in the audio output, wherein the controller is configured to:

determine a current feedback instability by combining outputs from multiple instability detectors, apply latch logic to the current feedback instability to determine a current mitigation value, wherein applying the latch logic comprises:

applying a baseline mitigation value associated with a baseline instability as the current mitigation value, after detecting the baseline instability value exceeds a nominal instability value associated with a nominal instability mitigation value, and modifying the current mitigation value in response to determining that the current feedback instability exceeds the baseline instability as controlled by a latch mechanism, and adjust a driver command signal based on the current mitigation value to mitigate feedback instability.

12. The wearable audio device of claim 11, wherein the baseline mitigation value is a single value that is greater than zero and no greater than one.

13. The wearable audio device of claim 11, wherein the nominal value is associated with a startup operation, a restart operation, or a mode change of the ANR system.

14. The wearable audio device of claim 11, wherein the baseline mitigation value is a lowest available multiplier that can be applied to the driver command signal.

15. The wearable audio device of claim 11, wherein the controller is further configured to determine an instability error value for the ANR system based on a comparison of the current instability value to a setpoint instability value, and, apply a gain to the instability error value.

16. The wearable audio device of claim 11, wherein adjusting the driver command signal based on the current mitigation value smooths a transition between ANR settings.

17. The wearable audio device of claim 11, wherein the controller is further configured to feed the current mitigation value into an integrator to control a baseline mitigation value.

18. A wearable audio device comprising:

an electro-acoustic transducer for providing an audio output, at least one microphone configured to detect noise; and a controller coupled with the electro-acoustic transducer and the at least one microphone, the controller including an active noise reduction (ANR) system for controlling noise in the audio output, wherein the controller is configured to:

determine a current feedback instability by combining outputs from multiple instability detectors, apply latch logic to the current feedback instability to determine a current mitigation value, feed the current mitigation value into an integrator to control a baseline mitigation value, and adjust a driver command signal based on the current mitigation value to mitigate feedback instability.

19. The wearable audio device of claim 18, wherein the baseline mitigation value is a single value that is greater than zero and no greater than one.

20. The wearable audio device of claim 18, wherein the baseline mitigation value is a lowest available multiplier that can be applied to the driver command signal.

* * * * *